United States Patent [19]

Lyter

[11] 4,043,582
[45] Aug. 23, 1977

[54] RESTRAINT DEVICE FOR RECREATIONAL VEHICLES

[76] Inventor: James T. Lyter, P.O. Box 724, Evergreen, Colo. 80439

[21] Appl. No.: 626,532

[22] Filed: Nov. 17, 1975

[51] Int. Cl.² .............................................. B62D 33/04
[52] U.S. Cl. .................................. 296/24 R; 280/749; 296/36; 297/390
[58] Field of Search ................. 296/36, 28 C, 23 MC, 296/24 R; 280/179 A, 749; 297/390

[56] References Cited

U.S. PATENT DOCUMENTS

| | | | |
|---|---|---|---|
| 1,959,974 | 5/1934 | Westgate | 280/749 |
| 2,316,710 | 4/1943 | Parke | 105/315 |
| 2,531,687 | 11/1950 | Jones | 105/315 |
| 2,740,642 | 4/1956 | Atwood | 280/744 |
| 3,169,781 | 2/1965 | Abruzzino | 280/749 |
| 3,276,512 | 10/1966 | Gallagher | 296/36 |
| 3,423,121 | 1/1969 | Lipkin | 280/749 |
| 3,443,824 | 5/1969 | Dietrich | 280/749 |
| 3,525,535 | 8/1970 | Kobori | 280/749 |
| 3,643,972 | 2/1972 | Caiati | 280/749 |
| 3,695,698 | 10/1972 | Trump | 297/390 |
| 3,713,695 | 1/1973 | Von Wimmersperg | 280/751 |
| 3,758,147 | 9/1973 | Burton | 296/23 MC |
| 3,831,975 | 8/1974 | Mednikow | 280/749 |

Primary Examiner—Robert R. Song
Assistant Examiner—John A. Carroll
Attorney, Agent, or Firm—H. Kenneth Johnston, II

[57] ABSTRACT

A restraint device for protecting young children in the sleeping compartments or bunks of a recreational vehicle includes a net-like device, constructed of flexible strands in close proximity of each other, that is supported within and attached to the upper bunk so as to provide simultaneous vertical and horizontal support. This net-like curtain arrangement transmits a portion of any horizontal force received by the device causing the lower fastening apparatus to become more securely fastened. Quick release snaps are provided in the net-like curtain device to allow an adult ready access to the infant in the bunk. The quick release mechanism is such that an adult may have ready egress from the bunk, but a young child cannot release the mechanism. The net-like curtain device slides to the side, out of the way when the bunk is not in use.

10 Claims, 6 Drawing Figures

RESTRAINT DEVICE FOR RECREATIONAL VEHICLES

BACKGROUND OF THE INVENTION

This invention relates to a restraint device for a sleeping compartment or bunk of a recreational vehicle, primarily that of any upper sleeping compartment or bunk, and is intended to prevent an occupant, most generally infants or young children, from being thrown therfrom as a result of sudden stops or starts, swerving or the like of the vehicle.

Currently, the recreational vehicles such as campers and motor homes have overhead or upper sleeping compartments or bunks in which young children ride and play in the seat. The types of restraint devices available are either cumbersome, extremely confining or do not provide the safety for young children. There are numerous devices available, however, that are only designed to restrain an adult from accidently being dislodged from the upper compartment, but due to the design of these devices, a child would not be properly restrained, if at all.

In a typical situation, children ride in the overhead compartment either to sleep or as a place in which they can view the trip and yet not crowd the cab of the vehicle. In either instance, it is important from the standpoint of the safety of the children that provisions be made to protect the children in the upper compartment against accidental dislodgement from the bunk, whether caused by rolling of the occupant when asleep or by sudden stops, swerves, or their movement when the vehicle is on the road.

The present invention fully meets these safety requirements for young children riding in the upper compartments of recreational vehicles.

The present invention further allows the storage of equipment in the sleeping compartment or bunk which might otherwise be thrown around the interior of the recreational vehicle under similar conditions.

SUMMARY OF THE INVENTION

In accordance with the invention, a restraint device for the upper sleeping compartment of a recreational vehicle is provided which employs a flexible net-like curtain which is secured at one end by means of a rod on the sleeping compartment which is attached to the body of the recreational vehicle. The net-like curtain is also supported by the base frame of the bunk by means of quick-release snaps on the inside of the bunk base frame. By virtue of this net-like curtain configuration and anchoring arrangement, not only is the bunk's occupant completely protected against being thrown out of or falling from the bunk, but any forces applied to the net-like curtain are transmitted in part horizontally causing the lower fastening apparatus to become more securely fastened.

Consequently, the net-like device may be installed rapidly with attendant savings in space, weight and cost of manufacture, yet adding to the decor of the recreational vehicle.

A provision for quick release of the restraining net-like curtain is included, so that the occupant may be easily removed from the bunk in the event of an emergency. The quick release may be in the form of snaps, buckles, Velcro (Tradename of Talon), or any similar quick release mechanisms.

BRIEF DESCRIPTION OF THE DRAWING

For a better understanding of the invention, reference may be made to the following description of an exemplory embodiment taken in connection with the figures of the accompanying drawing in which.

DESCRIPTION OF AN EXEMPLARY EMBODIMENT

Figure 1:
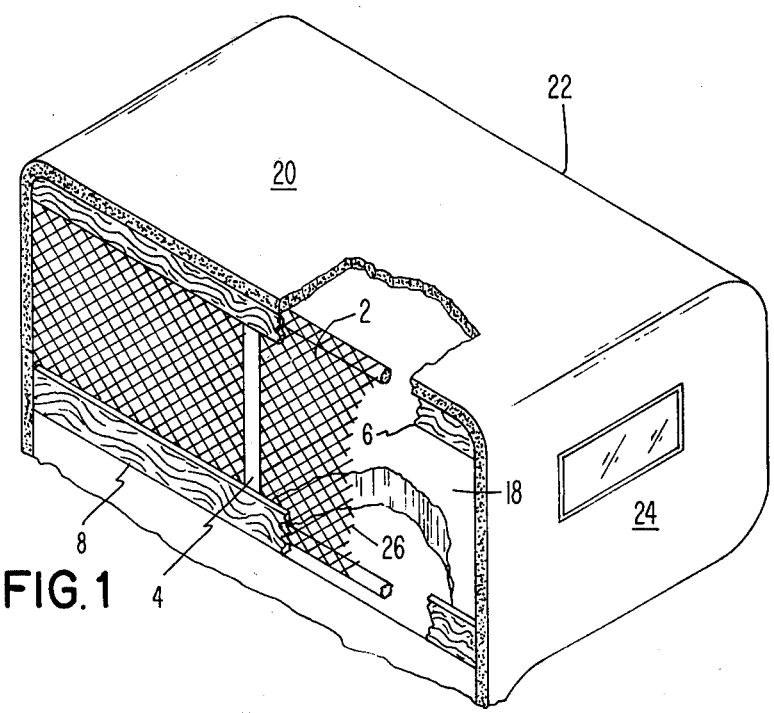
FIG. 1 illustrates, in perspective, the sleeping compartment restraint device of the present invention as installed in an upper sleeping compartment or bunk of a recreational vehicle, with the restraining position of the net-like restraint being indicated in hatch lines.

FIG. 1 depicts a typical arrangement of a sleeping compartment or bunk 18 within a recreational vehicle overhead cab 20 ie, so that the sleeping compartment or bunk lies transverse to the longitudinal axis of the vehicle and is enclosed on the front side by the front cab structure 22 and at either end by the side walls 24 of the cab. The lower portion of the back side is terminated by brace 8 of the sleeping compartment or bunk 18 normally is open over the full length of the bunk, and it is this area that a restraining device is required for the safety of children or other persons using the bunk.

A representative embodiment of the restraining device of the invention is shown installed in FIG. 1. It includes a flexible net 2, that according to a preferred construction, is constructed of flexible strands 26 connected to each other diagonally at a plurability of points, thus forming a net-like structure extending the length of the back side of the open sleeping compartment or bunk area. The net-like structure providing sufficient strength to meet or exceed the load restraining requirements to restrain young children or adults while in the sleeping compartment or bunk.

It is a feature of the invention that the net-like structure 2 is secured to the cab 20 in a way to transmit the horizontal component of any rear directed forces applied to it to the cab structure. For that purpose the flexible strands 26 are connected to rod 10 in a manner to allow the net-like structure 2 to slide transverse of the compartment in a substantially perpendicular plane of the bunk. Rod 10 is connected to brace 6 which is enclosed to cab 20 transmitting the horizontal forces from net-like structure 2 to the cab 20. The net-like structure 2 is directed downward, to be secured at end of the net-like structure to the bunk brace 8 or some other suitable rigid part of the sleeping compartment or bunk.

Attachment of the lower end of the net-like structure 2 to the bunk brace 8 is effected through a plurality of quick release devices such as snaps 12 or the like mounted with the male means on the bunk brace 8 and the female attached to the net-like structure 2.

Figure 5:
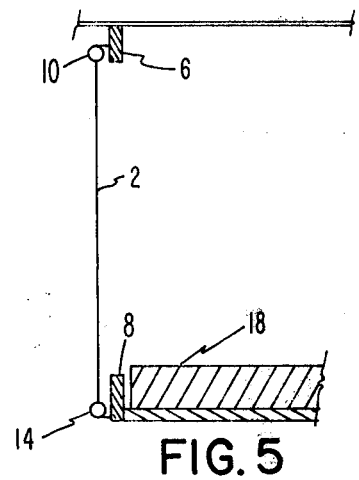
FIG. 5 is a side view showing a modification of the present invention wherein there are slide support means at the upper and lower portions of the sleeping compartment or bunk.

Refering to FIG. 5, a modified structure is shown wherein attachment of the lower end of the net-like structure 2 may be effected by connecting the flexible strands 26 to rod 14 in a manner to allow the net-like structure 2 to slide transverse of the compartment in a substantially perpendicular plane to the bunk. Rod 14 is connected to bunk brace 8 providing support for restraint.

Figure 2:
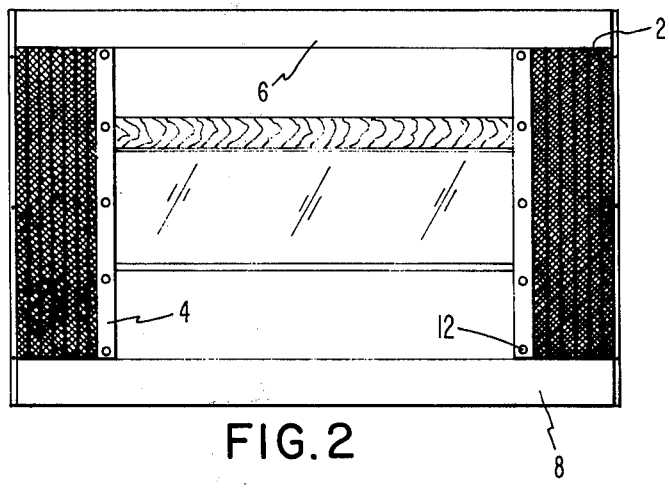
FIG. 2 is a frontal view indicating the net-like restraint device in the storage position.
Figure 3:
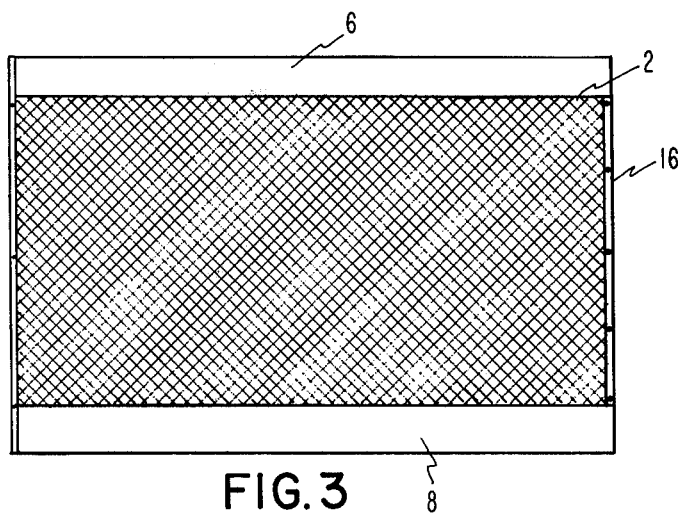
FIG. 3 is a modified form of the present invention showing a frontal view indicating the net-like restraint device in the restraining position being detachable from one side and permanently anchored at the opposite end.
Figure 6:
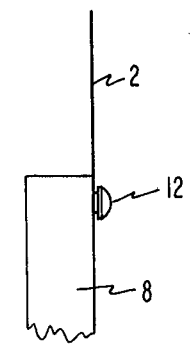
FIG. 6 is an enlarged detail of the quick release means of FIG. 4 looking in the same direction of FIG. 4.

In both the forms shown in FIGS. 2 and 3, each end of the net-like structure 2 is attached to the walls 24 of the cab 20. In the form shown in FIG. 3, attachment may be by disconnectable means such as snaps 16.

When assembled in the restraint position, ie, the position shown in FIG. 1, the net-like structure 2 is attached at the center 4 of the sleeping compartment or bunk with a plurality of quick release means such as snaps 12. It will be apparent therefore, that if a force is delivered to the verticle net-like structure 2, as by the occupant of the sleeping compartment or bunk being thrown backward as a result of a quick start of the vehicle for example, the horizontal component of such force will be transmitted by the net-like structure to cab 20, walls 24 and bunk braces 6 and 8 simultaneously. Hence, the cab structure would not normally require any additional structural strengthening to accomodate such a device.

When assembled in the open position, ie., the position shown in FIG. 2, the net-like structure 2 is decorative and adds to the decor of the interior of the recreational vehicle.

Figure 4:
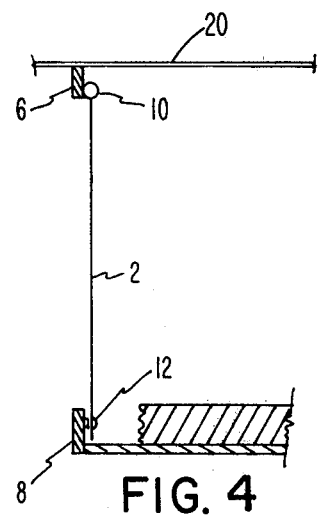
FIG. 4 is a side view indicating one version of the present invention wherein there are slide means at the top and the quick release means at the bottom.

The net-like structure 2 as shown in FIG. 2 may be affixed to the bunk braces 6 and 8 as shown in FIG. 4 wherein the upper portion of the net-like structure 2 is attached to brace 6 by rod 10 and the lower portion of the net-like structure 2 to bunk brace 8 by a quick release means such as snap 12.

In operation, the net-like structure 2 may slide on rod 10 opening and closing the structure upon release of a plurality of quick release means such as snap 12.

The net-like structure 2 as shown in FIG. 2 may also be affixed in the manner shown in FIG. 5 wherein the upper portion of the net-like structure 2 is attached to brace 6 by rod 10 and the lower portion of the net-like structure 2 is attached to brace 8 by rod 14. In operation the net like structure 2 may slide on rod 10 and 14, opening and closing the structure.

The net-like structure 2 as shown in FIG. 3 may be affixed to the bunk braces 6 and 8 as shown in FIG. 4 wherein the upper portion of the net-like structure 2 is attached to brace 6 by rod 10 and the lower portion of the net-like structure 2 to bunk brace 8 by a quick release means such as snap 12.

In operation, the net-like structure 2 may slide on rod 10 opening and closing the structure upon release of a plurality of quick release means such as snap 12.

The net-like structure 2 as shown in FIG. 3 may also be affixed in the manner shown in FIG. 5 wherein the upper portion of the net-like structure 2 is attached to brace 6 by rod 10 and the lower portion of the net-like structure 2 is attached to brace 8 by rod 14. In operation the net-like structure 2 may slide on rod 10 and 14, opening and closing the structure.

Should an emergency arise which necessitates rapid escape by the sleeping compartment or bunk occupant, a quick release means such as snap 12 is included in the net-like structure 2 at center 4 and bunk brace 8 and is opened like curtains as shown in the open position in FIG. 2.

Another feature of the invention, the quick release means 16 as shown in FIG. 3 is provided at one end of the net-like structure 2 which permits removal of the occupant by releasing only the one side without releasing the net-like structure 2 from bunk brace 8.

The invention further provides, through the quick release means such as snaps 12 that although adults being restrained have easy egress from the sleeping compartment or bunk 18 and yet young children cannot themselves readily exit the sleeping compartment or bunk 18 without the aid of an adult providing the necessary safety for both the children and the adults. Adults have easy access from the outside to remove young children.

It will be understood by those skilled in the art that the above described embodiment is intended to be merely exemplary, in that it is susceptable of modification and variation without departing from the spirit and scope of the invention, as set forth in the appended claims.

What is claimed:

1. A restraint device adapted to be positioned substantially completely across the open side of a compartment defined by a plurality of wall structures having upper, lower and side walls comprising:
   a substantially flexible means having four end portions,
   a first end portion affixed by a first securing means to one side wall structure,
   a second end portion affixed by a second securing means to an upper wall structure permitting said flexible means to slide transverse of said compartment in a substantially perpendicular plane,
   a third end portion affixed by a third securing means to a lower wall structure permitting said flexible means to slide transverse of said compartment in a substantially perpendicular plane,
   a quick release means including a first quick release member integral with a fourth end portion of said flexible means and second quick release member integral with opposing wall structure normally cooperating in interlocking engagement to secure said flexible means to said wall structure in a closed position, said quick release means disengageable to permit separation whereby said quick release means is normally engaged to frustrate disengagement and opening of said flexible means by infants but is easily engageable by adults whereby forces received horizontal to said flexible means in preventing the occupant from being dislodged from said compartment are transmitted to said wall structures.

2. A restraint device according to claim 1 wherein said second securing means affixed to said upper wall structure is a rod.

3. A restraint device according to claim 1 wherein said third securing means affixed to said lower structure wall consist of a plurality of snaps.

4. A restraint device according to claim 1 wherein said quick release means consist of a plurality of snaps.

5. A restraint device according to claim 1 wherein said third securing means affixed to said lower structure wall consists of a rod.

6. A restraint device adapted to be positioned substantially completely across the open side of a compartment defined by a plurality of wall structures having upper, lower and side walls comprising:

a plurality of substantially flexible means each having four end portions, a first end portion of a first flexible means affixed by a first securing means to one wall structure, a first end portion of a second flexible means affixed by a second securing means to an opposing wall structure of said affixed first flexible means, second end portions of said first and second flexible means affixed by a third securing means to an upper wall structure permitting said flexible means to slide transverse of said compartment in a substantially perpendicular plane, third end portions of said first and second flexible means affixed by a fourth securing means to a lower wall structure permitting said flexible means to slide transverse of said compartment in a substantially perpendicular plane, a quick release means including a first quick release member integral with a fourth end portion of said first flexible means and a second quick release member integral with a fourth end portion of said second flexible means normally cooperating in interlocking engagement to secure said flexible means together in a closed position, said quick release means disengageable to permit separation whereby said quick release means is normally engaged to frustrate disengagement and opening of said flexible means by infants but is easily engageable by adults whereby forces received horizontal to said flexible means in preventing the occupant from being dislodged from said compartment are transmitted to said wall structure.

7. A restraint device according to claim 6 wherein said third securing means affixed to said upper wall structure is a rod.

8. A restraint device according to claim 6 wherein said fourth securing means affixed to said lower wall structure consists of a plurality of snaps.

9. A restraint device according to claim 6 wherein said quick release means consists of a plurality of snaps.

10. A restraint device according to claim 5 wherein said fourth securing means affixed to said lower structure wall consists of a rod.

* * * * *